United States Patent [19]

Breider et al.

[11] 4,276,174
[45] Jun. 30, 1981

[54] CONTROL OF SLUDGE TEMPERATURE IN AUTOTHERMAL SLUDGE DIGESTION

[75] Inventors: Edmund J. Breider, Getzville; Raymond F. Drnevich, Clarence Center, both of N.Y.

[73] Assignee: Union Carbide Corporation, New York, N.Y.

[21] Appl. No.: 129,292

[22] Filed: Mar. 26, 1980

[51] Int. Cl.³ .................................................. C02F 11/04
[52] U.S. Cl. .................................... 210/613; 210/614; 210/630; 435/290
[58] Field of Search ............... 210/603, 604, 609, 613, 210/614, 620, 625, 630, 627; 435/289, 290

[56] References Cited

U.S. PATENT DOCUMENTS

| | | | |
|---|---|---|---|
| 1,902,550 | 3/1933 | Forrest | 435/289 X |
| 3,010,801 | 11/1961 | Schulze | 435/290 X |
| 3,384,553 | 5/1968 | Cuslavsky et al. | 435/289 X |
| 3,670,887 | 6/1972 | McWhirter | 210/604 |
| 3,857,757 | 12/1974 | Herrick et al. | 435/289 X |
| 3,926,794 | 12/1975 | Vahldieck | 210/604 |
| 4,026,793 | 5/1977 | Rein | 210/613 |
| 4,130,481 | 12/1978 | Chase et al. | 210/614 X |

*Primary Examiner*—Thomas G. Wyse
*Attorney, Agent, or Firm*—Steven J. Hultquist; Stanley Ktorides

[57] ABSTRACT

A process for controlling the autothermal aerobic digestion of sludge wherein sludge is mixed with an oxygen-containing gas in a covered digestion zone to form an aerated mixed liquor. The oxygen-containing gas is introduced into the mixed liquor being aerated at an oxygen concentration of at least 20% by volume, in sufficient quantity and rate to dissolve at least 0.03 pounds of oxygen per pound of total volatile solid content in the sludge introduced into the covered aerobic digestion zone, and the volatile solids content of the aerated mixed liquor is maintained at a high level. Temperature of the aerated mixed liquor is sensed, and the rate of introducing oxygen-containing gas into the aerated mixed liquor is controlled in response to the temperature sensing by increasing the rate of introduction of the oxygen-containing gas when temperature of the aerated mixed liquor decreases and by decreasing the rate of introduction of oxygen-containing gas when the temperature of the aerated mixed liquor increases, to maintain temperature of the aerated mixed liquor within predetermined limits.

9 Claims, 3 Drawing Figures

CONTROL OF SLUDGE TEMPERATURE IN AUTOTHERMAL SLUDGE DIGESTION

BACKGROUND OF THE INVENTION

1. Field of the Invention

This invention relates generally to a method for controlling sludge temperature in the autothermal aerobic digestion of such sludge.

2. Description of the Prior Art

U.S. Patent Application Ser. No. 027,801 filed Apr. 6, 1979 in the names of M. S. Gould et al describes a process for digestion of sludge wherein the sludge is oxygenated with an aeration feed gas containing at least 20% oxygen (by volume) in a first digestion zone at temperature of from 35° to 75° C. to partially reduce its biodegradable volatile solids content. The resulting partially stabilized sludge is then anaerobically digested in a covered second digestion zone at temperature of from 25° to 60° C. to yield a further stabilized sludge residue. In this process, the aerobic digestion in the first digestion zone is conducted for sludge retention time of 4 to 48 hours or, as alternatively specified, so as to reduce the volatile solids content of the sludge introduced to the first digestion zone by from 5 to 20%.

Within the above-mentioned broad ranges of sludge temperature and retention time, several embodiments of the foregoing process are possible. In one particularly advantageous embodiment, an autothermal aerobic digester is positioned in front of an anaerobic digester. Feed sludge having a relatively high total suspended solids content, e.g., 30,000 mg/l, is introduced into the aerobic digestion zone along with an oxygen-containing aeration feed gas, preferably containing at least 50% oxygen (by volume). The aeration feed gas preferably contains at least 50% oxygen (by volume), inasmuch as heat losses associated with an oxygen-containing gas of a lower oxygen concentration tend to become sufficiently large as to hinder autothermal thermophilic operation. Such high oxygen concentration gas is also preferably employed in order to secure an increased rate of oxygen mass transfer to the sludge during aerobic digestion to in turn provide an intensified aerobic digestive action.

In the aerobic digestion zone, the oxygen-containing aeration feed gas is contacted with the sludge, with aerobic digestion being continued for sufficient duration to satisfy one of the sludge retention time limitations (sludge retention time or sludge volatile solids reduction) discussed earlier herein. By utilizing a properly insulated, covered aerobic digestion zone, by maintaining the total solids content of the sludge in the aerobic digestion zone at a high level, and by utilizing a high oxygen content gas, one is able to maintain thermophilic operating conditions, i.e., a temperature of between 45° and 75° C., in the aerobic digestion zone autothermally.

Thermophilic operation of the aerobic digestion zone is preferred for several reasons. First, the rate of digestion in the aerobic digestion zone is directly related to temperature, with higher temperature generally corresponding to higher rates of digestion. As a result, the retention time necessary to achieve a given level of aerobic digestion will be shorter at higher temperatures. Second, by operating at thermophilic temperatures one is better able to maintain the subsequent anaerobic digester in the process within its optimum temperature range regardless of ambient temperature variations. Finally, by operating at thermophilic temperatures, and more specifically by operating at temperatures above about 50° C., one is able to ensure that the partially stabilized sludge discharged from the aerobic digestion zone is completely pasteurized. Pasteurization is a reduction of the concentration of pathogenic organisms in the sludge.

Following initial aerobic digestive treatment, partially stabilized sludge is passed from the aerobic digestion zone to an anaerobic digestion zone. In the anaerobic digestion zone, the sludge contents of the zone are continuously mixed, thereby creating a large zone of active decomposition and significantly increasing the rate of the stabilization reactions. A further stabilized sludge and a methane-containing digester gas produced in the anaerobic digestion are separately discharged from the anaerobic digestion zone.

The above-described digestion process has proven to be extremely stable in operation and highly resistant to process upsets due to fluctuations in process operating conditions, such as are common to conventional anaerobic digestion processes. Moreover, by utilizing biologically generated heat developed in the aerobic digestion zone to thermally stabilize the anaerobic digestion zone, more of the heat energy produced by the anaerobic digestion (i.e., in the form of combustible digester gas) is available for other uses. Nevertheless, this aerobic/anaerobic digestion process does have one significant drawback in commercial use. Due to variations, both periodic and non-periodic, in the strength (biodegradability), solids concentration and feed rate of the sludge introduced into the aerobic digestion zone, the temperature in such digestion zone may vary significantly. This temperature variation is evident even though the changes in strength, solids concentration and feed rate of the influent sludge to the aerobic zone are within the broad limits of operability disclosed in U.S. Ser. No. 027,801 for the aerobic/anaerobic sludge digestion process. Such changes in the character and flow of the influent sludge to the aerobic digestion zone may thus adversely effect the operation of the plant and the associated efficiency of sludge digestion treatment.

As an example of the foregoing, a sudden decrease in the amount of the sludge fed to the aerobic digestion zone gives rise to an increased sludge retention time in the aerobic digestion zone, the retention time being inversely related to the volumetric flow rate of sludge fed to the zone. The sudden decrease in the amount of sludge fed to the aerobic digestion zone will result in the temperature rising above the value selected for optimum operation at steady-state conditions and design values. Such undesirably high temperature condition gives rise to an excessive usage level of oxygen, as based on a unit mass of sludge in the aerobic digestion zone. Apart from increasing the operating costs for the digestion system due to increased oxygen consumption an excessive oxygen utilization level also results in a reduction of the quantity of volatile solids in the sludge that is fed to the subsequent anaerobic digestion zone. Such volatile solids reduction in turn reduces the amount of methane gas that can be produced by the downstream anaerobic step. On the other hand, an excessively low temperature in the aerobic digestion zone, such as may occur due to a sudden increase in the feed rate of sludge introduced to the aerobic digestion zone, may result in inadequate pasteurization of sludge, so that pathogenic organisms are passed from the aerobic digestion zone into the subsequent anaerobic digestion zone and ultimately pass out of the treatment system with the further stabilized sludge product from the anaerobic digester.

Finally, temperature fluctuations in the aerobic digestion zone may, if of sufficient magnitude, cause temperature fluctuations in the anaerobic digestion zone, such as could lead to an upset in the digestive process conducted in the latter zone.

Accordingly, it is an object of the present invention to provide a method for controlling temperature of sludge being treated in an autothermal aerobic digestion zone.

It is another object of the invention to provide a control method which modulates the consumption of oxygen-containing aeration feed gas in a highly efficient manner, as well as limiting the extent of digestion in an autothermal aerobic digestion zone disposed upstream of an anaerobic digestion zone, in such manner as to ensure that methane production in the downstream anearobic zone is maximized.

Other objects and advantages of the invention will be apparent by way of ensuing disclosure and the appended claims.

SUMMARY OF THE INVENTION

The invention relates to a process for controlling the autothermal aerobic digestion of sludge wherein the sludge is mixed with an oxygen-containing gas in the presence of aerobic micro-organisms in a covered digestion zone to thereby form an aerated mixed liquor therein.

The improvement of the invention comprises the following steps:

(a) maintaining the total volatile solids content of the sludge above at least 20,000 mg/l;

(b) maintaining the total volatile solids content of the aerated mixed liquor above at least $(100-X)\%$ of the total volatile solids content of the sludge, wherein $X=60$ times the ratio of the biodegradable volatile solids content of the sludge to the total volatile solids content of the sludge;

(c) introducing the oxygen-containing gas into the covered digestion zone for the aforementioned mixing at an oxygen concentration of at least 20% oxygen (by volume), with the mixing and the rate and quantity of the introduction of oxygen-containing gas being maintained at sufficient levels to dissolve at least 0.03 pounds of oxygen per pound of total volatile solids content in the sludge introduced into the covered aerobic digestion zone;

(d) sensing the temperature of the aerated mixed liquor; and (e) controlling the rate of introducing oxygen-containing gas into the aerated mixed liquor in response to the temperature sensing, by increasing the rate of introducing oxygen-containing gas into the aerated mixed liquor in response to a decrease in temperature of the aerated mixed liquor and by decreasing the rate of introducing oxygen-containing gas into the aerated mixed liquor when the temperature of the aerated mixed liquor rises, to maintain temperature of the aerated mixed liquor within a predetermined range.

As used herein the term "total volatile solids content" refers to the total weight loss which occurs upon igniting the dried residue of a sample of 550° C. pursuant to Part 224B of the *Standard Methods for the Examination of Water and Wastewater,* 13th edition, American Public Health Association, Washington, D.C., 1971, as a percentage of the weight of the original sample.

As also used herein the phrase "biodegradable volatile solids content" refers to the maximum reduction in solids achievable by aerating the sludge in the presence of an aerobic microbial culture, with an oxygen-containing gas at ambient temperature, e.g., 20° C., and at a dissolved oxygen concentration of at least 2 mg/l as a percentage of the weight of the original sample. Maximum reduction of solids is assumed to be reached after 30 days aeration. Specifications for this determination can be found in *Water Pollution Control,* Eckenfelder, W. W. and Ford, D. L., The Pemberton Press, 1970, page 152.

The term "sludge" means a solids-liquid mixture characterized by a solids phase and an associated liquid phase, in which the solids are at least partially biodegradable, i.e., capable of being broken down by the action of living micro-organisms.

DESCRIPTION OF THE PREFERRED EMBODIMENTS

Figure 1:
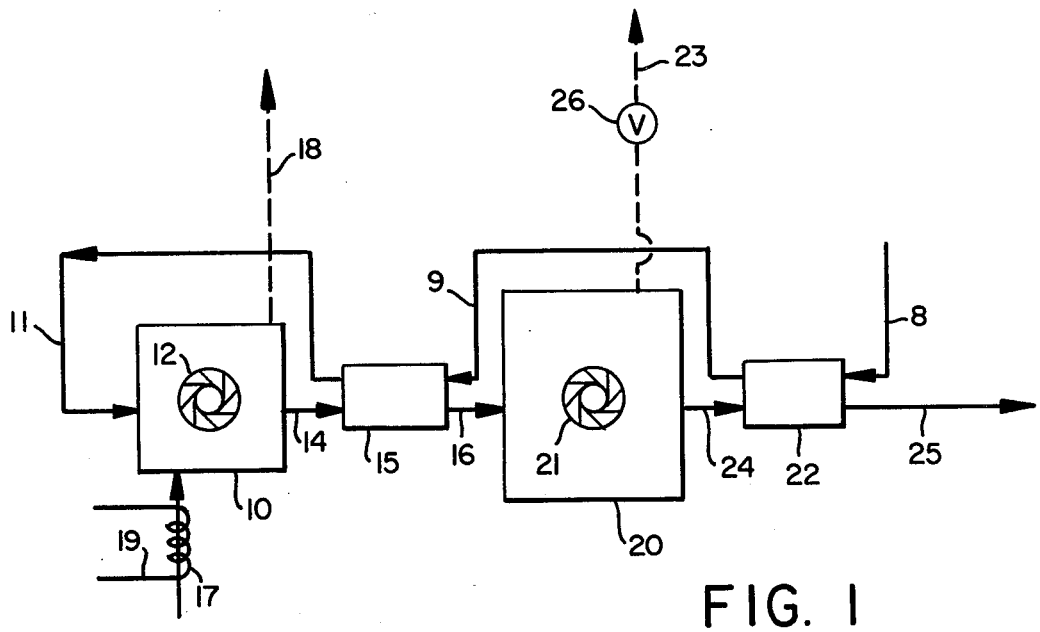
FIG. 1 is a schematic flowsheet of an aerobic/anaerobic digestion system according to Gould et al, U.S. Ser. No. 027,801, to which the process of the instant invention may advantageously be applied.

Referring now to FIG. 1, a schematic flowsheet of a process system according to Gould et al, U.S. Ser. No. 027,801, to which the instant invention may be applied, is shown; such system is suitable for sludge treatment with a thermophilic aerobic first digestion step followed by mesophilic anaerobic digestion. Sludge, which may derive from a source such as a primary sedimentation tank, the clarifier in an activated sludge wastewater treatment plant, a trickling filter, or from some other sludge-producing system, enters the process in line 8 and is sequentially heated in heat exchangers 22 and 15, as for example to a temperature of 30°-35° C., prior to introduction to the first digestion zone 10, to assist in maintaining the temperature in the zone in the thermophlic range of from 45° to 75° C. The ambient temperature sludge in line 8 is first heated in heat exchanger 22 by passage of the sludge in indirect heat exchange countercurrent flow relationship with the further stabilized sludge discharged from covered second digestion zone 20 in line 24. In this manner heat is recovered from the further stabilized sludge and the resulting cooled stabilized sludge is discharged from the heat exchanger 22 and passed out of the system in line 25 to final disposal or other end use. The further stabilized sludge entering the heat exchanger 22 in line 24 may suitably be at a temperature of 35°-40° C. so that the influent sludge exiting the heat exchanger in line 9 is warmed to temperature of 28°-30° C. From line 9 the partially warmed influent sludge is further heated in heat exchanger 15 to a temperature of 30° to 35° C. by indirect countercurrent flow heat exchange with the partially stabilized sludge discharged from the first digestion zone 10 in line 14 and passed from the heat exchanger in line 16 to the second digestion zone 20.

As an alternative to the above-described heat exchange with sludge product streams from the respective digestion zones, the influent sludge may be heated prior to introduction to the first digestion zone by indirect heat exchange with a suitable externally supplied heating medium such as steam or hot water, although heat recovery from the warm digestion zone product streams is preferred since it efficiently serves to conserve heat within the process and minimizes heating energy requirements for the process. Although heating of the influent sludge prior to its introduction to the first digestion zone is not essential in the broad practice of the sequential aerobic/anaerobic sludge digestion process, it may be desirable in practice to maximize the thermal efficiency of the elevated temperature process. The desirability of such heating of the sludge depends on the influent sludge solids content, sludge retention time in the aerobic digestion zone, and other process parameters.

The further heated sludge discharged from the heat exchanger 15 in line 11 is introduced to first digestion zone 10 along with aeration feed gas from line 17 as the process fluids for the first digestion step. The aeration feed gas in line 17 preferably comprises at least 50 percent and desirably at least 80 percent oxygen content (by volume) aeration feed gas in order to provide suitably high mass transfer driving force and rate of oxygen dissolution in the sludge at the high sludge temperatures in the first digestion zone. Line 17 is connected to a source of oxygen-containing aeration feed gas (not shown) which may for example comprise a cryogenic oxygen plant or supply vessel or an adiabatic pressure swing adsorption air separation unit, as conventionally available as supply source means for enriched oxygen-containing gas. As shown, the oxygen-containing aeration feed gas in line 17 may also be heated by heater 19 to assist in maintaining the temperature in the digestion zone 10 at the desired process level. As mentioned earlier herein, the aeration feed gas of preferably at least 50 percent and desirably at least 80 percent oxygen content (by volume) is employed in order to promote autothermal thermophilic sludge heating in the aerobic digestion zone while minimizing the quantity of oxygen-depleted digestion gas which is wasted from such digestion zone and which otherwise carries heat energy out of the process system.

The aerobic digestion zone is provided with a cover to form a gas space overlying the sludge therein from which waste oxygen-depleted digestion gas can be vented. Such arrangement permits a controlled venting of waste gas, as for example by a small vent conduit passing through the cover and joining the gas space with the external gas environment, and thereby promotes heat retention in the aerobic digestion zone relative to an uncovered zone wherein oxygen-depleted aeration gas is allowed to pass freely in bulk from the sludge volume being treated into the external gas environment, i.e., the ambient atmosphere. In addition, the cover for the aerobic digestion zone forms a gas space from which the oxygen-containing aeration gas can be recirculated against the sludge as for example by recirculation of gas from the overhead gas space to a submerged sparger device, or in which the sludge can be recirculated against the aeration gas, as for example by means of a surface aeration device. Such aeration gas or sludge recirculation arrangements permit the aerobic digestion step to realize high utilization of the oxygen content in the aeration feed gas introduced to the aerobic digestion zone.

In the aerobic digestion zone 10, the sludge and aeration feed gas fluids are mixed. If the digestion zone 10 is provided with a cover, one of the sludge and aeration feed gas fluids may desirably, as indicated above, and simultaneously with the mixing, be recirculated against the other fluid in the digestion zone in sufficient quantity and rate for aerobic digestion of the sludge while maintaining the total volatile solids content of the sludge at least at 20,000 mg/l. Such mixing and fluid recirculation is suitably effected by the contacting means 12 which may in practice comprise a submerged turbine sparger and a gas compressor, with the latter coupled to the gas head space in the digestion zone and to the gas sparger, for recirculation of the oxygen-containing aeration gas against the sludge, or, alternatively, the contacting means may comprise a surface aeration device for recirculating sludge against aeration gas in the gas head space of digestion zone 10. Recirculation of one of the sludge and aeration gas fluids against the other fluid in the aerobic digestion zone may, as indicated above, be desirable in order to obtain high levels of oxygen dissolution in the sludge and high utilization of the oxygen contained in the aeration feed gas. Nonetheless, such recirculation is not essential and in some instances it may be possible to obtain adequate dissolution of oxygen in the sludge and high utilization of oxygen in the aeration feed gas with a once-through flow of aeration feed gas through the aerobic digestion zone.

In the feed to the aerobic digestion zone, the total volatile solids content of the sludge is maintained at least at 20,000 mg/l so as to facilitate the maintenance of high aerated mixed liquor temperature in the first digestion zone, as necessary to obtain a satisfactory degree of partial sludge stabilization in the aerobic digestion zone at short retention times.

Under the foregoing process conditions, sludge is maintained in the first digestion zone for digestion at temperature in the thermophilic range of from 45° to 75° C., for rapid biodegradation of the sludge volatile solids content.

The aerobic digestion step is continued in the first digestion zone for sludge retention time of from 4 to 48 hours, to partially reduce the biodegradable volatile solids content of the sludge introduced to the first digestion zone. In terms of quantitative reduction of the sludge's solids content in the first digestion zone, the aerobic digestion step is preferably conduced so as to reduce the volatile solids content of the sludge introduced to the first digestion zone by from 5 to 20 percent. In the aerobic digestion step, the sludge retention time should be at least 4 hours in order to obtain a sufficient extent of partial stabilization in the first digestion zone; at retention times below 4 hours, the extent of sludge stabilization required in the subsequent anaerobic treatment step becomes disproportionately large relative to the stabilization level in the aerobic first step and the overall system retention time and tankage requirements begin to approach those of the conventional anaerobic digestion system with increasing loss of the unexpected improvement in these process variables (i.e., overall system retention time and tankage) characteristic of operation at retention times in the aerobic digestion step of from 4 to 48 hours. For correspondingly similar reasons, the sludge retention time in the aerobic digestion zone should not exceed 48 hours. Above such value, the extent of sludge stabilization in the aerobic digestion zone becomes unduly large with regard to the residual stabilization in the downstream anaerobic step, so that methane production in the latter step tends to be seriously adversely reduced, and again there is increasing loss of the improvement of the overall system retention time and tankage requirements achievable in connection with the aerobic digestion sludge retention time range of from 4 to 48 hours. Preferably, the retention time is in the range of from 12 to 30 hours, and suitably from 12 to 24 hours, based on the foregoing considerations.

Following the above-described aerobic digestion treatment, partially stabilized sludge is discharged from the aerobic zone in line 14 and oxygen-depleted digestion gas is separately discharged from the aerobic zone in line 18. The discharged oxygen-depleted digestion gas desirably contains at least 21 percent oxygen (by volume) in order to obtain suitably high utilization of oxygen contained in the aeration feed gas while maintaining the expenditure of energy for aeration gas and sludge contacting at a suitably low level for economic operation.

It has been found that by maintaining the sludge in the aerobic digestion zone at the thermophilic temperature of at least about 50°–52° C., substantially complete pasteurization of the sludge is achieved.

Partially stabilized sludge is discharged from the aerobic zone 10 in line 14 at temperature in the range of between 50° and 75° C. Inasmuch as this specific embodiment employs mesophilic anaerobic digestion in the covered second digestion zone 20, heat may desirably be removed from the partially stabilized sludge in line 14 to ensure efficient operation of the anaerobic sludge treatment step at a lower temperature than that employed in the first digestion zone 10. Accordingly, the sludge in line 14 is flowed through the heat exchanger 15 in indirect heat exchange relationship with the partially warmed influent sludge entering heat exchanger 15 in line 9. The cooled partially stabilized aerobically treated sludge then flows through line 16 for introduction to the covered second digestion zone 20. Alternatively, the partially stabilized sludge in line 14 could be cooled by an externally supplied cooling medium such as the clarified effluent of a wastewater treatment plant. Additionally, in winter operation, there may be no need to utilize a heat exchange step such as carried out by heat exchanger 15 for cooling of the partially stabilized sludge stream, since heat losses to the environment from the second digestion zone and the sludge stream flowing from the first to the second digestion zone may satisfactorily compensate for the absence of such heat exchanger.

The partially stabilized sludge introduced to the second digestion zone from line 16 is maintained therein under anaerobic conditions at temperature of from 25° to 45° C. for sufficient sludge retention time (duration) to further reduce the biodegradable volatile suspended solids content of the sludge, to less than about 40%, and preferably less than 20%, of the biodegradable volatile solids content of the sludge introduced to the first digestion zone, and form methane gas.

In the broad practice of the aerobic/anaerobic digestion process, the temperature of the sludge in the covered second digestion zone may be maintained in the range of 25° to 60° C., which includes both operation in the mesophilic range of 25° to 45° C. and operation in the thermophilic range of 45° to 60° C. For highly efficient operation, the anaerobic zone in mesophilic operation is maintained at a sludge treatment temperature of between 35° C. and 40° C., and preferably between 37° C. and 38° C. A preferred operating temperature range for aerobic thermophilic digestion is from 45° to 50° C. Operation in the foregoing preferred temperature ranges provides particularly rapid degradative action of biodegradable volatile solids by the microbial strains involved.

In the operation of the anaerobic digestion zone 20, the digestion zone contents are advantageously continuously mixed by agitation means 21, thereby creating a large zone of active decomposition and significantly increasing the rate of the stabilization reactions. Retention time of the sludge in the second digestion zone may suitably lie in the range of from 4 to 12 days and preferably in the range of from 5 to 9 days. Sludge retention times in the second digestion zone of less than 4 days may be undesirable because below such value, the retention time tends to become increasingly inadequate to support a large viable population of methane formers in the anaerobic step, with consequent adverse effect on the overall sludge stabilization performance of the digestion system. On the other hand, at sludge retention times in the anaerobic digestion step of greater than 12 days, the retention time for the second digestion zone becomes superfluously long, and the synergistic retention time and tankage requirement benefits realized by the integrated process in the broad retention time range of 4–12 days become increasingly difficult to achieve.

After anaerobic treatment of the sludge in the second digestion zone 20 is complete, the further stabilized sludge produced thereby is discharged from the second digestion zone in line 24 and heat exchanged for recovery of heat content against the influent sludge feed in heat exchanger 22 prior to final discharge from the process in line 25. The methane gas formed in the second digestion zone 20 as a product of the biochemical reactions conducted therein is discharged from the anaerobic treatment step in line 23 having flow control valve 26 disposed therein.

Figure 2:
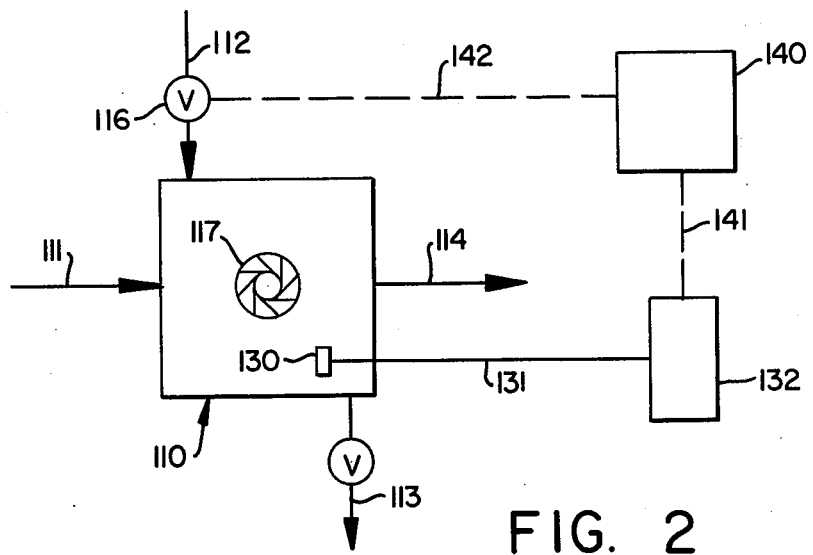
FIG. 2 is a schematic flowsheet of an aerobic digestion zone adapted to carry out the process of the instant invention.

Referring now to FIG. 2, a schematic flow sheet is shown of an aerobic digestion zone, which is generally similar to the aerobic digestion zone in the embodiment of FIG. 1 discussed above; the FIG. 2 embodiment shows the control elements which are employed to practice the method of the present invention and which could be applied to the aerobic digestion zone in the FIG. 1 system to conduct the invention therewith.

Sludge having a high volatile solids content is introduced via conduit 111 into covered and preferably well-insulated digestion zone 110. The sludge is mixed with an oxygen-containing gas, introduced into the digestion zone 110 through conduit 112 in the presence of aerobic micro-organisms to form an aerated mixed liquor. The sludge has a total volatile solids content above at least 20,000 mg/l. Concurrently, the total volatile solids content of the aerated mixer liquor is maintained above at least $(100-X)\%$ of the total volatile solids content of the sludge, wherein $X=60$ times the ratio of the biodegradable volatile solids content in the sludge to the total volatile solids content of the sludge. The oxygen-containing gas has an oxygen-concentration of at least 20% (by volume) and preferably 50% and is introduced into the mixed liquor undergoing aeration in sufficient quantity and rate to dissolve at least 0.03 pounds of oxygen per pound of total volatile solids content in the sludge introduced into the covered aerobic digestion zone.

In digestion zone 110, the oxygen-containing gas fed through conduit 112 is introduced by means of contacting device 117. A particularly advantageous method for introducing the gas into the digestion zone 110 in the practice of this invention is disclosed in U.S. Patent Application Ser. No. 031,296, filed Apr. 8, 1979 in the name of C. Scaccia. According to the method disclosed in that application, oxygen-containing gas is introduced over the bottom of a digestion zone as small bubbles which are then allowed to rise more or less freely through the aerated mixed liquor. As the bubbles rise through the mixed liquor, however, they tend to coalesce. In accordance with the method of the Ser. No. 031,296 case, these bubbles are repeatedly re-sheared into smaller bubbles as the gas rises through the mixed liquor. It is to be understood, however, that the method of the present invention is not limited to any particular mass transfer device or method, subject only to the restriction that the oxygen-containing gas be introduced into the mixed liquor undergoing aeration in sufficient quantity and rate to dissolve at least 0.03 pounds of oxygen per pound of total volatile solids content in the sludge introduced into the covered aerobic digestion zone. The oxygen-depleted gas which is not dissolved in the mixed liquor in digestion zone 110 is vented from the digestion zone through conduit 113.

Subsequent to achievement of the required degree of aerobic digestive treatment, the partially stabilized sludge is discharged through conduit 114 for subsequent treatment as desired or appropriate. Preferably, the partially stabilized sludge discharged from the aerobic digestion zone is passed to a downstream anaerobic digestion zone in the manner discussed in connection with the embodiment of FIG. 1. As used herein, the term "partially stabilized" means that the total volatile solids content of the sludge introduced through conduit 111 to the aerobic digestion zone has been reduced by not more than about 50% and preferably about 20% within the digestiion zone 110.

Inasmuch as the total volatile solids content of the sludge and the aerated mixed liquor is maintained at a high level and also because the oxygen-containing gas is introduced into the (insulated) covered digestion zone 110 at the aforementioned quantity and rate, the temperature of the aerated mixed liquor in the digestion zone 110 will autothermally rise to a temperature substantially above the temperature of the influent sludge introduced to the digestion zone. Moreover, if the oxygen concentration of the oxygen-containing gas is maintained above 50%, then the temperature of the mixed liquor will autothermally rise to thermophilic temperatures, i.e., a temperature between 45° and 75° C.

The actual temperature prevailing in the mixed liquor in digestion zone 110 is measured by temperature sensor 130. Sensor 130 generates a signal based on this temperature sensing and this signal is thereupon transmitted to recorder 132 via signal transmitting means 131. Recorder 132 may advantageously make a record of the temperature of the mixed liquor in digestion 110 as a function of elapsed time. Such temperature history is then monitored by controller 140, which may be automatic controller means or which may be a manual plant operator. The controller 140, if automatic, then generates a control signal or if the controller is a plant operator, corrective action is taken (the control signal of the automatic controller is transmitted by signal transmitting means 142 in the FIG. 2 drawing) to adjust the aeration feed gas flow control valve 116 in response to the sensed temperature. In such manner, as discussed more fully hereinafter, the mixed liquor temperature in the digestion zone is maintained within a predetermined range, i.e., the fluctuations of temperature of the mixed liquor in the digestion zone are suppressed by modulation of the flow rate of oxygen-containing aeration feed gas introduced to the digestion zone.

When automatic control is employed in the method of the invention, as opposed to manual control by a human operator, the oxygen-containing aeration feed gas flow rate may be controlled continuously according to the temperature/oxygen feed rate relationship for the digestion process, as previously determined by calculation, experiment, or otherwise. The manual control of the temperature/oxygen feed rate variables may be step-wise in character, with the oxygen-containing aeration feed gas flow rate being modulated at intervals to return mixed liquor temperature to a satisfactory or desired value, if necessary.

The actual control logic associated with the present invention is rather simple in character. For example, as the temperature of the aerated mixed liquor in digestion zone 110 starts to decrease, such as may be caused by an increase in the feed rate of the sludge introduced to the digestion zone, the aerated mixed liquor temperature, as decreased, will be continuously monitored by temperature sensor 130 and will be ultimately transferred to controller 140, which then increases the feed rate of the oxygen-containing gas by further opening flow control valve 116. Such increase in the feed rate of the oxygen-containing gas produces a corresponding increase in biological digestive activity within the digestion zone 110 and thereby causes the temperature of the mixed liquor in digestion zone 110 to return (rise) to its proper level. Conversely, if the temperature of the mixed liquor in the digester begins to increase, such as may occur if the feed rate of the sludge introduced to the digester decreases, the oxygen-containing gas is decreased, which in turn reduces biological activity and causes the temperature of the aerated mixed liquor in the digestion zone to decrease to its proper level.

While the control method of the present invention has been described with respect to fluctuations in feed rate of the sludge introduced to the digestion zone, mixed liquor temperature variations in the digestion zone will also be caused by a change in the composition of the sludge, i.e., its ease of degradability by the aerobic micro-organisms present, as well as changes in the total volatile solids content of the sludge introduced to the digestion zone; these changes and their consequent effect on mixed liquor temperature levels can be fully and efficiently accommodated by the method of the present invention.

The temperature control method of this invention is based upon the positive regulation of biologically generated heat by limiting or controlling the amount of oxygen available for digestive destruction of volatile solids in the digestion zone. The method is based, inter alia, on the finding that it is not necessary to maintain any significant dissolved oxygen level in the mixed liquor in the digester. In other words, the aerobic digestion itself must be neither kinetically nor mass transfer limited. To ensure that the digestion system is not kinetically limited, the conditions in the aerobic digestion zone must be such that the rate of volatile solids removal and therefore the rate of biological heat generation, occurs at a rate sufficient to offset any heat losses from the digestion zone. Additionally, to ensure that the digestion system is not mass transfer limited, the conditions in the digestion zone must be such that the mass transfer capability of the aeration device employed for aeration gas/sludge contacting in the digestion zone must exceed the oxygen requirements of the aerated mixed liquor.

In order to satisfy the foregoing requirements, and effectively employ the method of the present invention, three basic requirements must be satisfied. First, the total volatile solids content of the sludge must be maintained above about 20,000 mg/l. Second, the total volatile solids content of the aerated mixed liquor must be at least $(100-X)\%$ of the total volatile solids content of the sludge fed to the digestion zone, wherein $X=60$ times the ratio of the biodegradable volatile solids content of the sludge to the total volatile solids content of the sludge. Third, the oxygen-containing gas containing at least 20% oxygen (by volume) must be introduced into the mixed liquor being aerated in sufficient quantity and rate to dissolve at least 0.03 pounds of oxygen per pound of total volatile solids content in the sludge introduced into the covered aerobic digestion zone. Preferably, the oxygen-containing gas contains at least 50% oxygen (by volume). If the total volatile solids concentration of the sludge and the aerated mixed liquor is too low, then the heat lost through the sensible heat of the digestion zone effluent becomes a dominant heat loss, and the amount of biologically generated heat available is not sufficient to maintain elevated temperatures in the digestion zone at the desired level. Moreover, by maintaining the total volatile solids content of the aerated mixed liquor above at least $(100-X)\%$ of the total volatile solids content of the sludge, wherein $X=60$ times the ratio of the biodegradable volatile solids content of the sludge to the total volatile solids content of the sludge, the rate of the aerobic digestive activity in the digestion zone is maintained at a sufficiently high level to ensure the required rate of heat generation to maintain autothermal operation. Finally, the oxygen must be introduced into the mixed liquor being aerated in sufficient quantity and rate to dissolve at least 0.03 pounds of oxygen per pound of total volatile solids content in the sludge introduced into the covered digestion zone, so as to support the high rate of digestive activity. If a feed gas with a low concentration is used, e.g., air, then the heat lost by water evaporation from the aerated mixed liquor may become a significant heat loss and the degree of functionality between the feed rate of the oxygen-containing gas and the temperature of the aerated mixed liquor may be reduced. As a result, in such circumstances it will only be possible to operate the covered aerobic digestion zone within the mesophilic and near thermophilic temperature range of from 30° to 45° C. Preferably, the oxygen concentration of the oxygen-containing gas is maintained above about 50% oxygen (by volume) and most preferably above about 80% oxygen (by volume), so that the aerated mixed liquor can be autothermally maintained at thermophilic temperatures.

Figure 3:
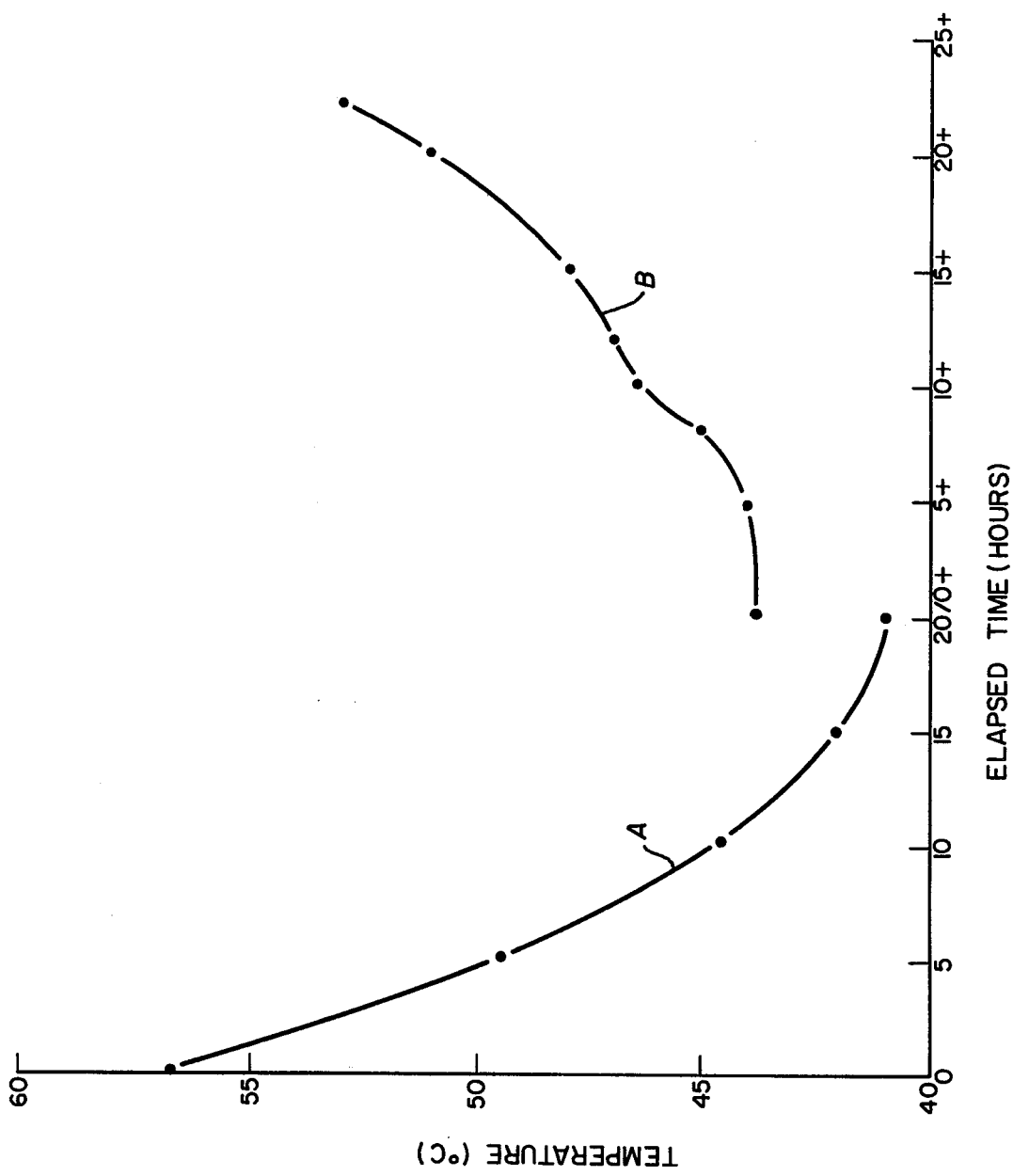
FIG. 3 is a graph in which the aerated mixed liquor temperature is plotted as a function of elapsed time for an autothermal aerobic digestion vessel, as uncontrolled (Curve A) and as controlled (Curve B) by the method of the instant invention.

With an automatic control system, the feed rate of the oxygen-containing gas may be changed almost instantaneously in response to a change in the temperature of the mixed liquor undergoing aeration in the digestion zone. However, in a system for the digestive treatment of wastewater sludge, an attempt at such a precise method of temperature control is frequently not necessary, and in such cases, the control system can suitably be step-wise in character, such as is amenable to the implementation of manual control. In such type of manual control arrangement, an operator will periodically check the temperature of the mixed liquor and will vary the feed rate of the oxygen-containing gas in response thereto. The effect of this type of control method is shown by the empirical data plotted in the graph of FIG. 3. This data was collected from a pilot plant system wherein sludge was digested sequentially in aerobic and anaerobic digestion zones, as constructed and operated in accordance with the previously described Gould et al U.S. Patent Application Ser. No. 027,801. The aerobic digestion zone was constituted by a covered vessel, approximately 60 gallons in liquid capacity, provided with an aeration device of the type disclosed in the aforementioned C. Scaccia U.S. Patent Application Ser. No. 31,296. The aeration device consisted of a 1-inch shaft having a 4-arm ($12\times16$-inch diameter) rotating sparger located near the tank bottom and a 4-arm (16-inch diameter) bubble shearing means, spaced 15.5 inches above the tank bottom.

In the operation of the above-described pilot plant system, at time equal to 0 hours, the feed rate of the sludge introduced into the digestion vessel (aerobic zone) was changed from 50 gallon/day to 100 gallons/day. This change in feed rate corresponds approximately to a reduction in the detention time of the sludge in the aerobic digester from 24 hours to 12 hours. The feed rate of the oxygen-containing gas fed to the digestion zone, however, was not changed. Instead, the oxygen feed rate was held constant at 100 cubic feet/day. The resultant effect on temperature level is shown by the plotting of the data on the curve identified as Curve A. As shown, temperature of the mixed liquor in the digestion zone immediately decreased in magnitude and eventually dropped from about 57° C. to about 41° C. over the course of the next 20 hours. In other words, the mixed liquor temperature in the aerobic digester in this uncontrolled test (i.e., no control of oxygen-containing gas feed rate in response to sensed temperature in accordance with the present invention) fell below the thermophilic temperature range. Subsequently, the same pilot plant was operated in the manner of the present invention, with modulation of oxygen-containing aeration feed gas flow rate to the aerobic digestion zone in response to sensed mixed liquor temperature. This subsequent test generated the data plotted in FIG. 3 as Curve B. At the beginning of the subsequent test in accordance with the present invention, the retention time was still 12 hours while the feed rate of the oxygen-containing gas to the aerobic digestion zone was increased from 150 cubic feet/day to 200 cubic feet/day. As shown by Curve B in the graph, the mixed liquor temperature in the aerobic digestion zone then began to rise steadily. After the 20th hour, the temperature of the mixed liquor had risen back above 50° C.

In actual practice, the temperature of the mixed liquor in the aerobic digestion zone would quickly be monitored at approximately 4 to 8 hour intervals and, depending on the occurrence of any changes in the aerated mixed liquor temperature, appropriate correction of the feed rate of the oxygen-containing gas to the aerobic digestion zone would be made at that time. Moreover, in most commercial installations of the aerobic/anaerobic sludge digestion system, the rate of change of the feed rate, composition, or concentration of the influent sludge would not be as drastic as was intentionally introduced during this experiment. Nonetheless, the test does clearly show the occurrence of excessive temperature fluctuations without the control method of the present invention being employed, as well as the temperature-correcting character of the control method of the instant invention.

Although preferred embodiments have been described in detail, it will be appreciated that other embodiments are contemplated with modification of the disclosed features, as being within the scope of the invention.

What is claimed is:

1. In a process for controlling the autothermal aerobic digestion of sludge, wherein the sludge is mixed with an oxygen-containing gas in the presence of aerobic micro-organisms in a covered digestion zone to thereby form an aerated mixed liquor which is retained in said digestion zone for sufficient time to partially stabilize the sludge, the improvement comprising:

(a) maintaining total volatile solids content of the sludge above at least 20,000 mg/l;
   (b) maintaining total volatile solids content of the aerated mixed liquor above at least $(100-X)\%$ of the total volatile solids content of the slude, wherein $X=60$ times the ratio of the biodegradable volatile solids content of the sludge to the total volatile solids content of the sludge;
   (c) introducing said oxygen-containing gas into said covered digestion zone for said mixing therein at an oxygen concentration of at least 20% oxygen (by volume) with said mixing and the rate and quantity of the introduction of oxygen-containing gas being maintained at sufficient levels to dissolve at least 0.03 pounds of oxygen per pound of total volatile solids content in the sludge introduced into said covered digestion zone;
   (d) sensing temperature of the aerated mixed liquor; and
   (e) controlling the rate of introducing oxygen-containing gas into the aerated mixed liquor in response to the temperature sensing, by increasing the rate of introducing oxygen-containing gas into the aerated mixed liquor when temperature thereof decreases and by decreasing the rate of introducing oxygen-containing gas into the aerated mixed liquor when temperature thereof increases, to maintain temperature of the aerated mixed liquor within a predetermined range.

2. A process according to claim 1 wherein said oxygen-containing gas contains at least 50% oxygen (by volume).

3. A process according to claim 1 wherein said oxygen-containing gas contains at least 80% oxygen (by volume).

4. A process according to claim 1 wherein said covered digestion zone is insulated to decrease the loss of heat from the aerated mixed liquor to the ambient environment of the digestion zone.

5. A process according to claim 1 wherein aerobic digestion of sludge is carried out in said covered digestion zone for sludge retention time (duration) of from 4 to 48 hours to partially stabilize said sludge and thereafter passing same to a covered second digestion zone for anaerobic digestion of said partially stabilized sludge therein while maintaining temperature of the sludge in the second digestion zone in the range of from 25° to 60° C., for sufficient solids retention time (duration) to further reduce the biodegradable volatil solids content of the sludge to less than about 40% of the biodegradable volatile solids content of the sludge introduced to the aerobic digestion zone, and form methane gas, with discharge of further stabilized sludge and said methane gas from said second digestion zone.

6. A process according to claim 4 wherein temperature of the sludge in said second digestion zone is maintained in the range of from 35° C. to 40° C., for mesophilic digestion of sludge in said second digestion zone.

7. A process according to claim 4 wherein temperature of the sludge in said second digestion zone is maintained in the range of from 45° to 50° C., for thermophilic digestion of sludge in said second digestion zone.

8. A process according to claim 4 wherein sludge retention time of sludge in said second digestion zone is from 4 to 12 days.

9. A process according to claim 1 wherein volatile solids content of the sludge introduced to said aerobic digestion zone is reduced by from 5 to 20% in said digestion zone.

* * * * *